United States Patent [19]

Coppa et al.

[11] Patent Number: 4,657,728
[45] Date of Patent: Apr. 14, 1987

[54] MACHINE FOR EXAMINING A NUCLEAR REACTOR FUEL ASSEMBLY

[75] Inventors: Louis Coppa, Aix en Provence; Christian Mengual, Manosque; Alain Ripart, Meudon la Foret; Francis Zava, Manosque, all of France

[73] Assignee: Commissariat a l'Energie Atomique, Paris, France

[21] Appl. No.: 599,070

[22] Filed: Apr. 11, 1984

[30] Foreign Application Priority Data

Apr. 13, 1983 [FR] France ................................ 83 06027

[51] Int. Cl.[4] .................... G21C 17/00; G21C 17/08; G21C 19/06; B25J 19/02
[52] U.S. Cl. .................................. 376/248; 376/249; 376/261; 901/44; 901/47
[58] Field of Search ................ 376/248, 249, 260, 261, 376/262; 901/44, 47

[56] References Cited

U.S. PATENT DOCUMENTS

| | | | |
|---|---|---|---|
| 3,621,580 | 11/1971 | Tovaglieri | 33/555 |
| 3,727,119 | 4/1973 | Stanley et al. | 318/568 |
| 4,170,891 | 10/1979 | Elsner | 73/1 R |
| 4,217,173 | 8/1980 | Jabsen | 376/251 |
| 4,465,325 | 8/1984 | Favre et al. | 308/5 R |

FOREIGN PATENT DOCUMENTS 2304149 10/1976 France .
2395571 1/1979 France .

OTHER PUBLICATIONS

Kerntechnik, vol. 19, No. 3, 1977, B. J. Selig, "Nuclear Systems Inspection Services", pp. 110–116; *pp. 110–111, paragraph 2.2, Insp. Equipment; FIG. 2*.
Selig, "Nuclear Systems Inspection Services" Kerntechnik vol. 19, No. 3 1977.

Primary Examiner—Herbert B. Guynn
Assistant Examiner—Eric Jorgensen

[57] ABSTRACT

A machine for examining a nuclear reactor fuel assembly, having a flooring of elongated shape, a rotary container located on a support at one end of the flooring, two vertically arranged rigid structures each consisting of two parallel tubes, a latching mechanism for the fuel assembly, including a large and a small branch which are pivotable with respect to each other, a device for immobilizing the small branch relative to the large branch, a trolley that can be displaced along the flooring towards and away from the support and carries a vertical column along which a bracket with a carriage is movable on which a television system or the like for examining the fuel assembly may be mounted.

2 Claims, 5 Drawing Figures

MACHINE FOR EXAMINING A NUCLEAR REACTOR FUEL ASSEMBLY

BACKGROUND OF THE INVENTION

The invention discloses a machine for examining a nuclear reactor fuel assembly having a flooring, support means for an assembly to be examined, which keep the latter in the vertical position, means for examining the assembly and means for displacing the examination means, said displacement means incorporating a vertically extending column and resting on the flooring. The column carries a bracket which is vertically displaceable along the column. The bracket supports a trolley or carriage which is transversely displaceable relative to the bracket.

A fuel assembly for a nuclear reactor, particularly a water-cooled reactor is constituted by a large number of sheath fuel and/or fertile rods or slugs kept in a parallel bundle by a rigid structure formed from two end pieces, respectively an upper end piece and a lower end piece, which are interconnected by metal bars. These assemblies are arranged in the core of the reactor between two plates, namely a lower plate and an upper plate.

It is necessary to inspect these fuel assemblies, particularly to detect any deformations of the rods and/or the retaining structure and also to detect risks of cracking. During reactor shutdown, certain assemblies which have operated under pressure and high temperature are discharged and transferred with the aid of appropriate handling means to an examination machine, which makes it possible to inspect the same.

In general terms, a fuel assembly examination machine has a support on which the assembly to be examined is vertically positioned and means for examining the assembly, which can be displaced relative to the latter, generally along three orthogonal axes.

For example, French patent No. 2,298,859 filed on 22.1.1975 for an "Apparatus and installation for the examination of fuel rods of a nuclear reactor" discloses a machine of this type. It has three movable trolleys or carriages, the first being vertically displaced on slides parallel to the assembly fuel rods, the second being horizontally displaced on slides carried by the first trolley or carriage and the third being displaced horizontally perpendicular to the second. The examination means, constituted by an endoscope carried by the third carriage can consequently be displaced in three perpendicular directions.

In addition, a machine for examining a nuclear reactor fuel assembly is known, which has a base B, a column C mounted at the end of the base and a platform D fixed at the end thereof opposite to that of the column. Platform D can rotate. Means 22 make it possible to rotate the same. Examination means can be moved vertically along column C. However, a disadvantage of these examination machines is that they do not permit an adequate moving back of the examination means.

Thus, in the case of the examination machine described in the aforementioned French patent No. 2,298,859, the possibilities of moving back the examination means are limited by the dimensions of the first trolley or carriage. These dimensions could certainly be increased, but this would have the disadvantage of simultaneously increasing the weight and overhang of the latter. In addition, the displacement means of the examination means do not constitute an easily dismantlable assembly, which can be replaced in case of need. The examination means according to the invention obviates these disadvantages. Therefore, the invention discloses a machine for examining a fuel assembly which permits greater displacements.

This problem is solved by the fact that the column is fixed to a trolley, which is displaceable on the flooring, which makes it possible to move the column towards or away from the assembly to be examined. This feature makes it possible to adapt the invention to various functions as a result of its displacement capacity. These can consist of examination with a camera, specific measurement with especially designed equipment, such as ultrasonic measuring devices, eddy current devices or laser means. It is also possible to adapt a machining device, e.g. for drilling or milling.

Moreover, the invention discloses an examination machine for the fuel assemblies of nuclear reactors having a flooring, means for supporting an assembly to be examined, which keep the assembly in the vertical position, means for examining the assembly, and means for displacing the latter, a support structure located at one end of the flooring and a chamber or container rotating about its vertical axis and receiving the assembly.

U.S. Pat. No. 3,621,580 discloses an examination means of this type. In this machine, the fuel assembly to be examined rests in the vertical position on a support which is rotatable by means of a manually operable hand wheel. The assembly is held in its upper part by a member, which can be fixed at an appropriate height to the column supporting the examination means. Such a machine makes it possible to rotate the assembly. However, it does not make it possible to immobilize it at characteristic positions which are accurately defined by gradually rotating the same. Moreover, the assembly is not accurately maintained in the position which it occupied when still in the reactor core.

SUMMARY OF THE INVENTION

The examination machine according to the invention makes it possible to solve these problems as a result of the fact that two rigid structures are arranged vertically and parallel on the support structure, each of the structures having a lower end and an upper end, the structures resting on the support structure by their lower end, connection means being provided between the upper end of said structures, a turn buckle or latch means located on the upper part of the rigid structures and which has a large branch and a small branch, the small branch being mounted in pivotable manner on the large branch, two pins each located at one end of the large branch, two pins each located at one end of the small branch, a fixing block having an orifice for receiving a pin of the large branch being provided in the upper part of each of the rigid structures, a plate integral with the small branch having holes distributed at characteristic positions and a device for immobilizing the small branch in rotation with respect to the large branch.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
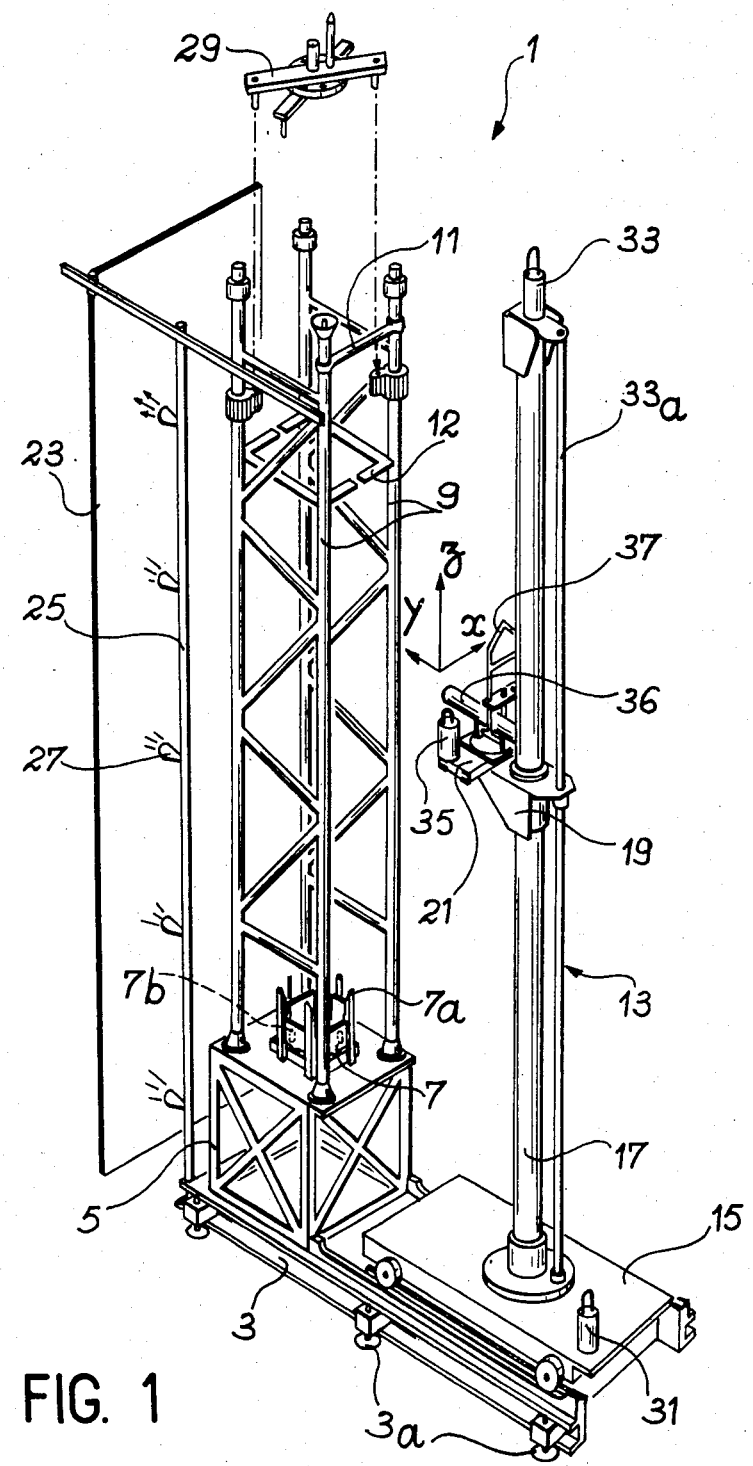
FIG. 1 a general perspective view of the fuel assembly examination machine according to the invention.

FIG. 1 shows a general perspective view of the fuel assembly examination machine according to the invention. It comprises a flooring 3 resting on the bottom of the pool, a support structure 5 located at one end of the flooring 3, a rotary chamber or container 7 receiving the water box 85 of the assembly, which is an integral part of the base of the assembly and which will be referred to hereinafter as the "foot of the assembly". Two lateral structures 9 rest on support structure 5. Structures 9 are vertical and parallel and are positioned on either side of the fuel assembly. They are constituted by vertical, parallel tubes interconnected by a triangular structure. They are connected at their upper end by a bar 11. Flooring 3 of support structure 5, container 7 and structures 9 form part of the means for supporting the fuel assembly to be examined. The latter is placed on container 7 for examination purposes.

The machine according to the invention also has means for examining the assembly, but they do not form part of the actual invention. In conventional manner, they can be e.g. constituted by a television camera. Conversely, the means for displacing the examination means constitute a feature of the present invention. These displacement means 13 are constituted by a trolley 15 movable on flooring 3, a column 17 fixed to trolley 15, a bracket 19 which is vertically displaceable along column 17 and a carriage 21 transversely displaceable on bracket 19. The actual examination means are fixed to the transverse carriage 21. The machine also has a screen 23 and two floodlighting systems 25, to which are fixed floodlighting bulbs 27.

In the upper part, structures 9 have two retractable safety forks 12, which maintain the fuel assembly in position during its installation. The structures 9 also support a latch means 29, which serves to secure the upper part of the fuel assembly.

In the present embodiment, the fuel assembly is a 17×17 assembly, i.e. an assembly having a square cross-section, whereof each side has 17 fuel rods.

The assembly is installed in the following way. The assembly is suspended by means of tongs fixed to the upper end piece thereof. Thus, the storage rack is removed and is brought to a height making it possible to ensure an adequate height of water above the assembly during the loading of the examination machine. In the present embodiment, the assembly is raised in such a way that its base is 1 meter from the bottom of the pool. The safety forks 12 are raised and screen 23 is, if necessary, pivoted. The rotary container 7 has pins 7a making it possible to preposition the foot of the assembly. A more precise positioning is made possible by pins 7b. The assembly is brought into position by lowering it and is placed on the rotary container. The safety forks 12 are lowered and the tongs are disengaged from the assembly. By means of tongs, the latch means 29 are placed on lateral structures 9 and the position of the latch means pins in the upper end piece of the assembly is checked. The tongs are then disengaged from the latch means. As from this instant, the fuel assembly is held and centered in the lower part by the pins 7b of the rotary container and in the upper part by the pins of the latch means. It is therefore possible to safely raise the safety forks 12, which permits the rotation of the assembly and the examination of the entire height thereof.

As can be seen in FIG. 1, the means for displacing the examination means 13 comprise a motor 31 and a coding system integral with the trolley 15 ensuring the longitudinal movement of the latch, which further ensures the vertical movement of bracket 19. A guidance column 33a maintains the orientation of bracket 19. A counterweight, not visible in FIG. 1, is positioned within the hollow column 17 and serves to balance the weight of the bracket supporting the transverse carriage 21 and the examination means. A motor 35 and its coding system ensure the lateral movement of transverse carriage 21. A support 37 makes it possible to fix the examination means, e.g. a television camera 36 and orientable, dismantlable projectors. These motors 31, 33 and 35 can be dismantled in a remote manner. In the case of an incident, the control of the three movements can take place manually and remotely.

Figure 3:
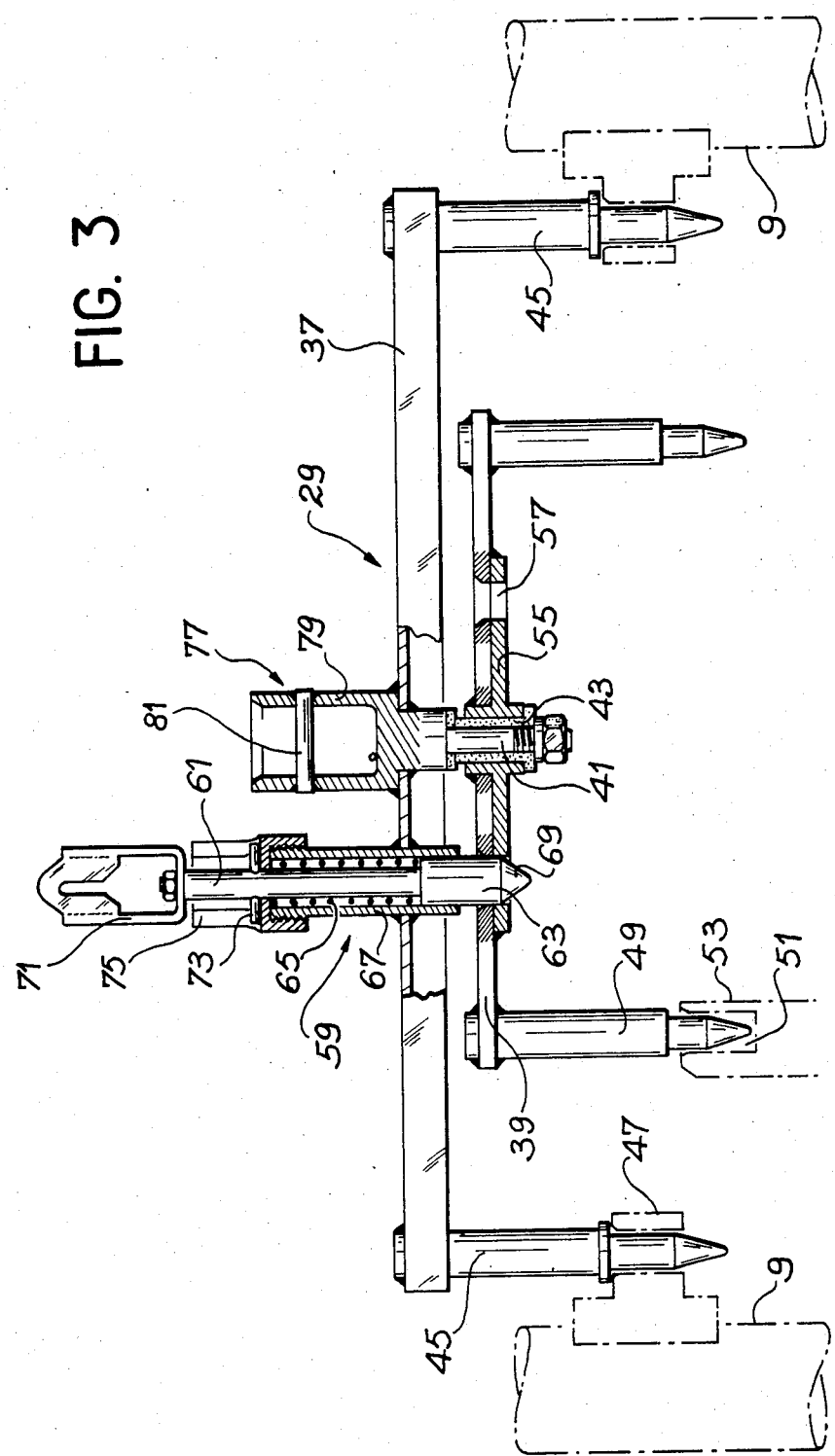
FIG. 3 a detail showing the turn buckle or latch means.

Flooring 3 has six jacks 3a enabling the same to be brought to the correct level relative to the bottom of the pool on which it rests. FIG. 3 shows in greater detail the latch means 29 constituted by a large branch 37 and a small branch 39. These two branches are pivotably assembled to one another in the manner shown in FIG. 1. A spindle 41 is fixed to the large branch 37. The small branch 39 has a ring 43 which pivots around spindle 41. Moreover, the large branch 37 has at its two ends two pins 45 which can be fitted to a support 47, shown in dot-dash lines, which is itself fixed to the longitudinal post of lateral structures 9, also shown by dot-dash lines in FIG. 3.

The small branch 39 has two pins 49 which are fixed to its ends. The pins 49 are fitted into two positioning orifices diagonally opposite to the upper end piece 53 of the fuel assembly shown in dot-dash lines in FIG. 3. In addition, a disk 55 is fixed to branch 39 and has positioning holes distributed in a circular manner and are e.g. at 45° from one another. A mechanism 59 fixed to branch 37 permits the immobilization of the small branch 39 at its characteristic positions, which corresponds to a given orientation of the fuel assembly relative to the examination means. In the embodiment described, mechanism 59 is constituted by a bar 61 having at its lower end a smaller diameter part 63 connected to part 51 by a shoulder on which bears a return spring 65. A spring 65 is positioned in a tube 67 used for guiding bar 61. At its lower end, bar 61 also has a conical part 69 aiding its penetration into orifices 57 of perforated disk 55 integral with branch 39. A ring 71 is fixed to the upper end of bar 61, e.g. by means of a screw as shown in FIG. 3. By means of a hook entering ring 71, it is possible to raise bar 61, which frees the rotation of disk 55 and consequently branch 39 integral with the fuel assembly. Two lugs 73 fixed to bar 61 make it possible to immobilize it in the raised position by pivoting it so as to introduce the lugs 73 into a circumferential slot on part 75, which constitutes a plug closing tube 67.

The latch means 29 also comprises a fixing end fitting 77 for the handling tongs. In the present embodiment, this end fitting is constituted by a tube 79 welded to branch 37 and diametrically traversed by a spindle 81 which permits the fixing of a bayonet-type device.

Figure 2:
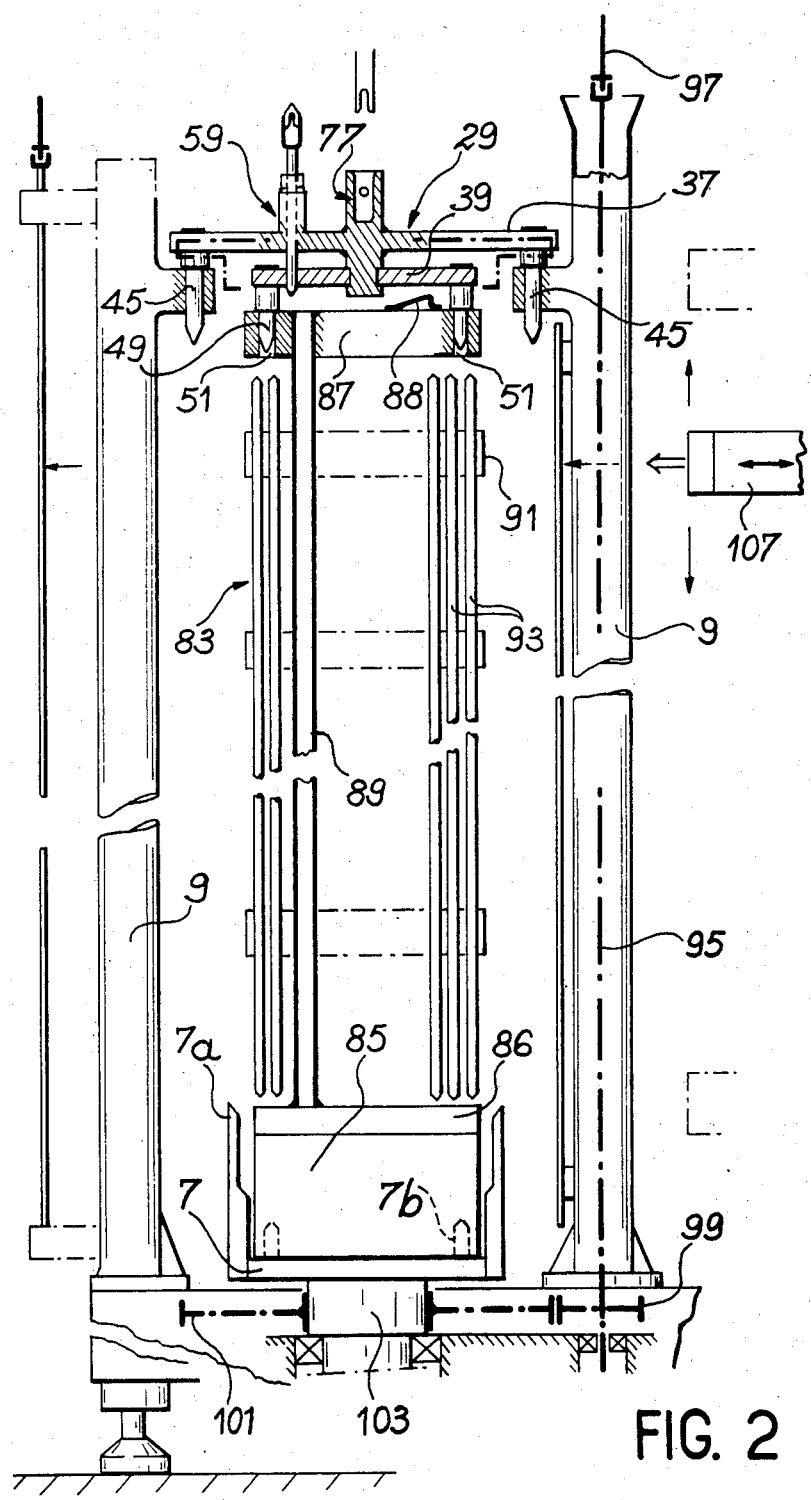
FIG. 2 a sectional view of part of the fuel assembly support structure.

FIG. 2 is a sectional view of the support structure of the fuel assembly, which more particularly shows the means permitting the rotation of the rotary container in order to permit the examination of all the faces of the assembly.

The fuel assembly is designated in FIG. 2 by reference numeral 83. In a conventional manner, it comprises two rigid end pieces, a lower end piece 86 and an upper end piece 87 fixed to either end of rigid guide tubes 89, whereof only one is shown in FIG. 2. The guide tubes carry several spacing grids 91, which hold in place a bundle of fuel rods 93.

When installed in the core of the reactor, assemblies of this type are positioned between an upper plate and a lower plate of the core, which forms part of the framework in the reactor vessel. In order to permit their fixing between the upper and lower plates of the core structure, the end pieces 85 and 87 have positioning orifices 51.

FIG. 2 also shows the latch means 29 with the large branch 37, the small branch 39, the device 59 for immobilizing the small branch in rotation relative to the large branch and the device 77 for fixing the handling tongs. The pins 45 of large branch 37 enter corresponding fixing orifices provided on the members of the lateral structures 9.

The upper end piece 87 also has an elastic element 88, which forces assembly 83 against the lower core plate counter to the cooling water stream which passes through it from bottom to top. The water box 85 of the lower end piece 86 of fuel assembly 83 is fixed into pins 7b of rotary container 7.

Rotary container 7 permits assembly 83 to rotate in ¼ turn divisions about its vertical axis, so that each of its faces can be successively examined. It is also possible to immobilize the assembly in the characteristic positions corresponding to the orifices of disk 55 of latch means 29. For example, these characteristic positions can correspond to an angle of 45°.

The fuel assembly is rotated by rotary container 7 only, the latch means 29 being free in rotation. Container 7 is controlled by a pinion system 95, whose manual control 97 is at the top of the posts of structure 9. The gradual rotation of the assembly can be stopped at any time for examination under a random angle or can be indexed in characteristic positions, e.g. every 45°. As can be seen in FIG. 2, the pinion system is constituted by a first bar 95 arranged vertically within a post of structure 9, a toothed pinion 99 driving a toothed ring 101, which drives a spindle 103 and the rotary container 7 to which it is connected.

In order to measure the deformation of springs, once the latch means 29 has then been removed, a plate (not shown) is applied, which has a mass equal to the action exerted by the upper core plate on springs 88 of the upper end piece 87, when the assembly is installed in the reactor core structures. This makes it possible to simulate the compression of springs 88. The stresses withstood by the structure of assembly 83 during the measurements are consequently identical to those existing when it is installed in the core. The measurement carried out by a measurement means 107, diagrammatically shown in FIG. 2, are consequently as close as possible to reality.

This plate bears on structures 9 by four lugs fitted into the orifices in said parts. The overall deformation of the four springs is evaluated by measuring the sag of each of the sides of the plate. Details of the deformation of each spring could be obtained by applying a weight to each of them.

The latch means 29 - rotary container 7 system ensures that the assembly 83 is maintained in a completely vertical position and positions it under favourable conditions for the required examinations. The performance of the latter is also simplified by the absence of obstacles over the entire height of the assembly. A pole manually controlled from the side of the pool imparts a rotary movement to bar 95 of the pinion system and makes it possible to rotate the assembly and the small branch 39 of the latch means. This movement can be motorized and controlled by a rotation measurement means.

In the present embodiment, the examination means incorporate a camera. This camera can be moved parallel to its optical axis along axes x, y, z. The field observed by the camera, considered to be defined by the extreme positions given to the optical axis, is as a minimum the vertical face of assembly 83, as well as the two juxtaposed direct and indirect measurement devices. A control table of the camera-holding carriage gives the displacement controls in the three axes x, y and z, the choice of the speed and direction of displacement, with three displacement counters locked onto each of the movements x, y and z.

The vertically positioned direct measurement means are constituted by a graduated millimetric scale and a diameter 10 mm standard fuel rod, fixed to the tubes of structures 9 facing the camera. These two elements have the length and arrangement necessary for covering in height all the levels of the fuel assembly 83. The displacements of the camera are displayed on a console with the display of the values of digital coders. The values read on the screen on two graduated scales fixed to the members only serve as a reference, as do those read directly on a graduated strip stuck to the console screen or by means of a graduated reticule appearing on the screen by means of an electronic device. In vertical metrology, the measurement takes place from a reference which is the bottom of the rotary container, whilst in horizontal metrology, the reference is one of the generatrixes of the standard rod fixed to the graduated scales. In the initial phase of the measurement, one of the branches of the reticule appearing on the screen must coincide with the chosen reference 9.

The examination apparatus permits two vertical metrology means, namely direct and indirect vertical metrology. In direct vertical metrology, the camera is vertically displaced up to coincidence on the screen of the upper edge of the graduated strip and stuck to the screen or reticule. This strip is graduated in ½ mm. Its upper edge materializes on the screen the line of the horizontal plane passing through the optical axis of the camera and which substantially passes through the centre of the screen. Its coincidence setting with the reference horizontal of the apparatus is obtained by referring to adapted reference marks on the assembly support in the field covered by the camera. The camera is vertically displaced up to coincidence on the screen of the upper edge of the graduated strip and the chosen reference (upper edge of the lower end piece, lower end of a fuel rod 93, etc). The vertical dimension indicated by the scale opposite to the upper edge should be noted. The camera is vertically displaced in order to align on the screen the upper edge of the strip and the second chosen reference (lower edge of the upper end piece, upper end of the rod in question). The new dimension should be noted under the same conditions. The difference between the two dimensions noted directly gives in millimetres the length of the component in question.

In indirect vertical metrology, the procedure is the same as for direct vertical metrology, except that in place of noting the indication supplied by the scale on the screen, note is taken of the two corresponding indications supplied by the displacement counter associated with the vertical displacement of the camera. The difference between these two indications multiplied by a coefficient of the kinematic chain of the vertical displacement of the camera gives the sought vertical dimension.

Horizontal metrology essentially relates to the measurement of the distance between two fuel rods. After adequately moving in the camera of the fuel assembly in such a way as to e.g. enable the camera to cover three or four rods, the camera is horizontally displaced in order to position the image of the standard rod essentially in the centre of the screen. The apparent distance on the screen of the two generatrixes of the rod related to the graduated scale of the screen enables the calibration of the latter.

By moving the camera in such a way that the axis of the considered channel is substantially in the centre of the screen, it is possible to measure the size of said channel by referring to the graduated reticule of the console screen. By photographing the screen and the graduated reticule, photographic metrology of the considered channel is obtained.

The system of carriage or trolley 15 carrying the examination means is of simple design, but is of great importance when it is considered that the examination machine must always operate immersed in water. As a result, there is a considerable flexibility of use of the examination means. Bracket 19 only ensuring a vertical displacement function reduces possible errors regarding the positioning of the examination means. A larger longitudinal displacement margin is permitted and is only limited by the length of the rails. It is therefore possible with an adequate rearward movement to examine the complete fuel assembly, photograph it with its number, observe the arching of the fuel rods, etc. It is possible to adapt various specific measuring devices with equipment such as measuring devices using ultrasonics, laser beams, eddy currents and possibly for machining purposes.

Figure 4:
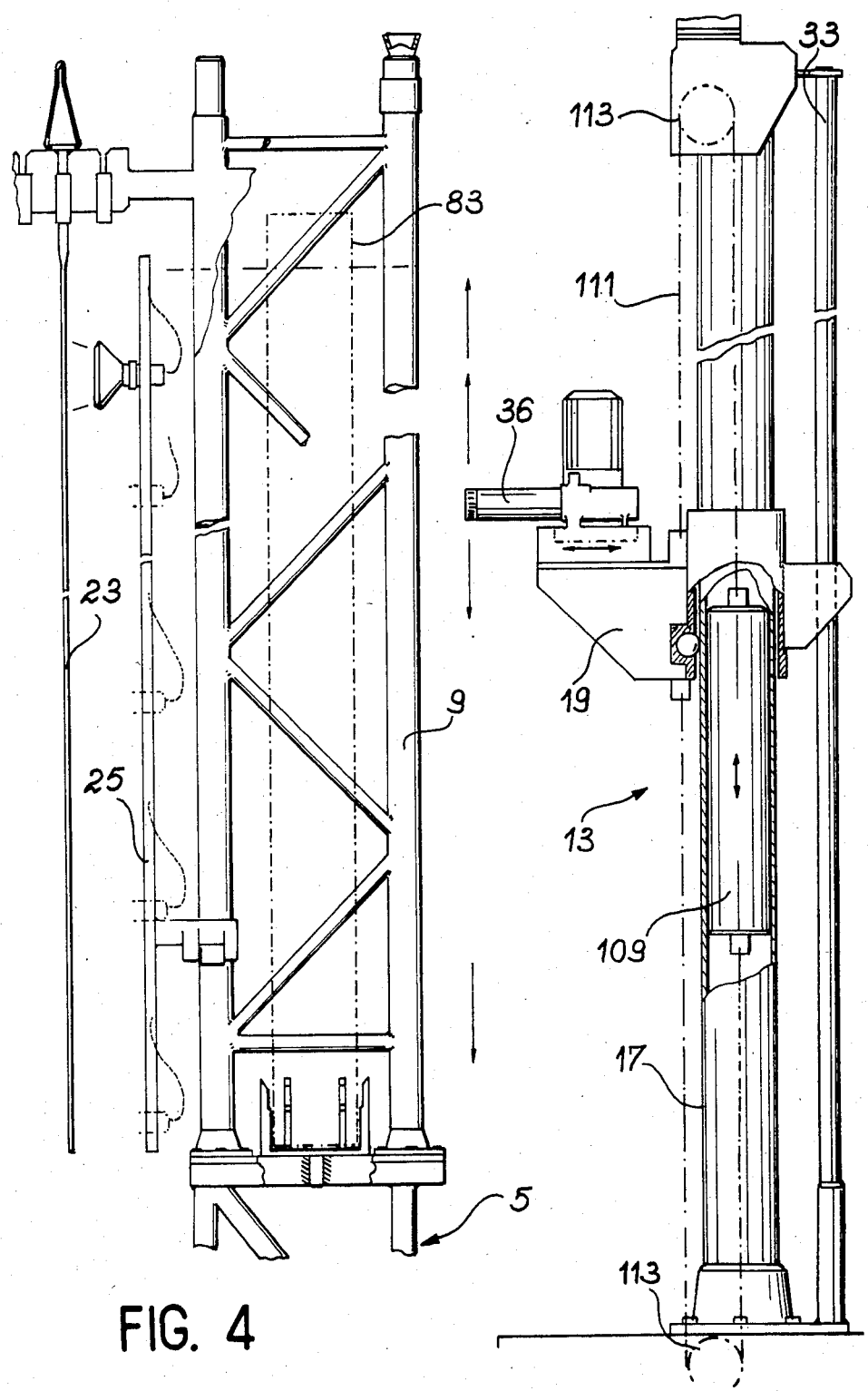
FIG. 4 a side view of the upper part of the machine according to the invention showing the structures for maintaining the assemblies in place and the means for displacing the examination means.

FIG. 4 shows a side view of the examination machine according to the invention. This partly sectional view of the column 17 shows a counterweight 109 located within the latter and which balances the weight of bracket 19 and the examination means. A cable 111 passing over a pulley 113 connects bracket 19 to counterweight 109. FIG. 4 also shows screen 23 and one of the two floodlighting systems 25.

Figure 5:
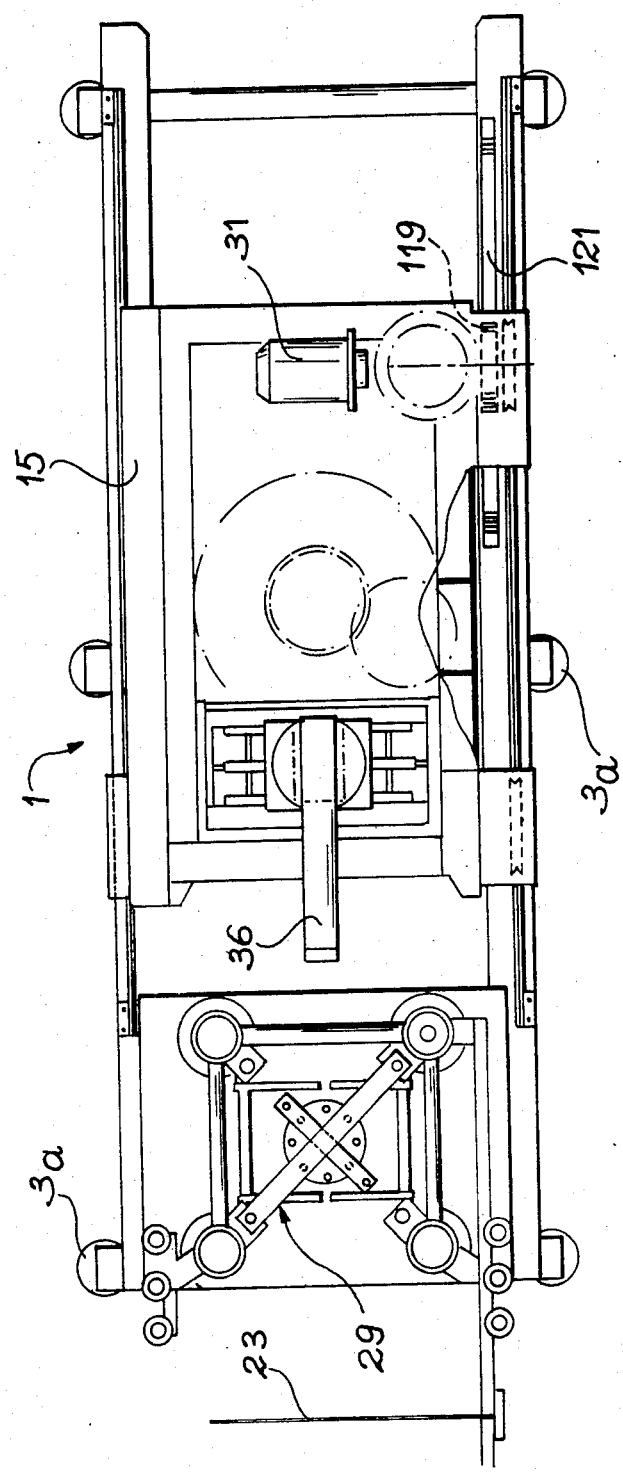
FIG. 5 is a plan view of the examination machine according to the invention.

FIG. 5 is a plan view of the examination machine according to the invention. It makes it possible to obtain a better idea of the control of the longitudinal displacement of trolley 15. Motor 31 which is fixed thereto drives a pinion 119 meshing with a rack 121, which makes it possible to move in or out the trolley and consequently camera 36 of the assembly to be examined.

What is claimed is:

1. A machine for examining a nuclear reactor fuel assembly, said machine comprising: a flooring having a generally elongated shape, a support located at one end of said flooring, a rotary container located on said support for receives said fuel assembly, two rigid structures arranged in vertical position and parallel to each other for positioning the fuel assembly, each of said structures having an upper end and a lower end, said lower ends resting on said support, each rigid structure being constituted by two parallel tubes connected to each other, means for rotating said rotary container, latch means for connecting the fuel assembly to the upper ends of said structures and having a large branch and a small branch, the small branch being rotatably fitted to the large branch, two pins respectively located at opposite ends of the large branch, two pins respectively located at opposite ends of the small branch, a fixing block at each of the upper ends of the rigid structures, each fixing block having an orifice for receiving the respective pin of the large branch, a plate fixed to the small branch and having orifices at predetermined positions; a device for immobilizing the small branch so as to prevent the same from rotating relative to the large branch; a trolley displaceable along said flooring towards and away from said support, a vertically extending column resting on said trolley and carrying a bracket, the bracket being vertically displaceable along the column, the bracket supporting a carriage, said carriage being transversally displaceable with respect to the bracket, said carriage supporting means for examining said fuel assembly.

2. An examination machine according to claim 1, wherein said immobilizing device comprises a bar having an end, the bar being located within a tube, a spring for biasing the bar downwardly within the tube, the end of the bar being engageable in the orifices of the plate for immobilizing the small branch relative to the large branch in a plurality of positions.

* * * * *